June 5, 1956

H. ALLEN ET AL 2,748,605

MECHANICAL MOVEMENT FOR CONVERTING ROTARY
MOVEMENT TO LINEAR, THEN ROTARY, THEN
REVERSE LINEAR MOVEMENT

Filed May 1, 1950

HERBERT ALLEN
MADDEN T. WORKS
INVENTORS.

BY Browning & Simms

Attorneys

HERBERT ALLEN
MADDEN T. WORKS
INVENTORS.

June 5, 1956  H. ALLEN ET AL  2,748,605
MECHANICAL MOVEMENT FOR CONVERTING ROTARY
MOVEMENT TO LINEAR, THEN ROTARY, THEN
REVERSE LINEAR MOVEMENT Filed May 1, 1950  3 Sheets-Sheet 3

HERBERT ALLEN
MADDEN T. WORKS
    INVENTORS.

BY Browning & Simms
    Attorneys

United States Patent Office 2,748,605
Patented June 5, 1956

2,748,605

MECHANICAL MOVEMENT FOR CONVERTING ROTARY MOVEMENT TO LINEAR, THEN ROTARY, THEN REVERSE LINEAR MOVEMENT

Herbert Allen and Madden T. Works, Houston, Tex., assignors to Cameron Iron Works, Inc., Houston, Tex., a corporation of Texas Application May 1, 1950, Serial No. 159,202

21 Claims. (Cl. 74—22)

This invention relates to improvements in plug valve actuators and refers more particularly to actuators for valves of the type wherein the plug valve member, in operation, is first moved from its seat, then rotated to a new operative position, and then reseated.

Many attempts have heretofore been made to provide a valve and actuator of the character indicated, but such attempts have not been entirely satisfactory, especially where high pressures are to be controlled. However, this type of actuation for a plug valve, particularly where the plug valve member is tapered and engages a tapered seat, is very desirable in the interest of ease of operation of the valve. This is true because the valve may be forced loose when stuck against the seat without any torque being applied thereto. The unseated valve member may then be rotated without any friction between the valve member and seat to resist turning.

An object of this invention is to provide a valve actuator, of the class described, which is rugged and simple in construction and positive in operation.

Another object is to provide a valve actuator of the class described in which the rotation of the hand operating part in one direction opens the valve and reverse rotation of the hand operating part closes the valve.

A further object is to provide in a valve actuator of the class described having rugged cam parts for connecting a rotary drive member to a plug valve member, which will provide considerable mechanical advantage for unseating the plug valve member and for seating it and will positively rotate the plug valve member to a new operational position.

Still another object is to provide a valve actuator of the class described employing a rack and pinion in its drive mechanism.

A still further object is to provide a valve actuator of the class described wherein the mechanical advantage for moving the plug valve member from its seat when in one operational position of the plug valve member may be greater than mechanical advantage provided for unseating the plug valve member when in its other operational position.

Other and further objects of the invention will appear as the description proceeds.

In the accompanying drawings constituting a part of the instant specification, which are to be read in conjunction therewith, and wherein like reference numerals are used in the various views to indicate like parts:

Figure 2:
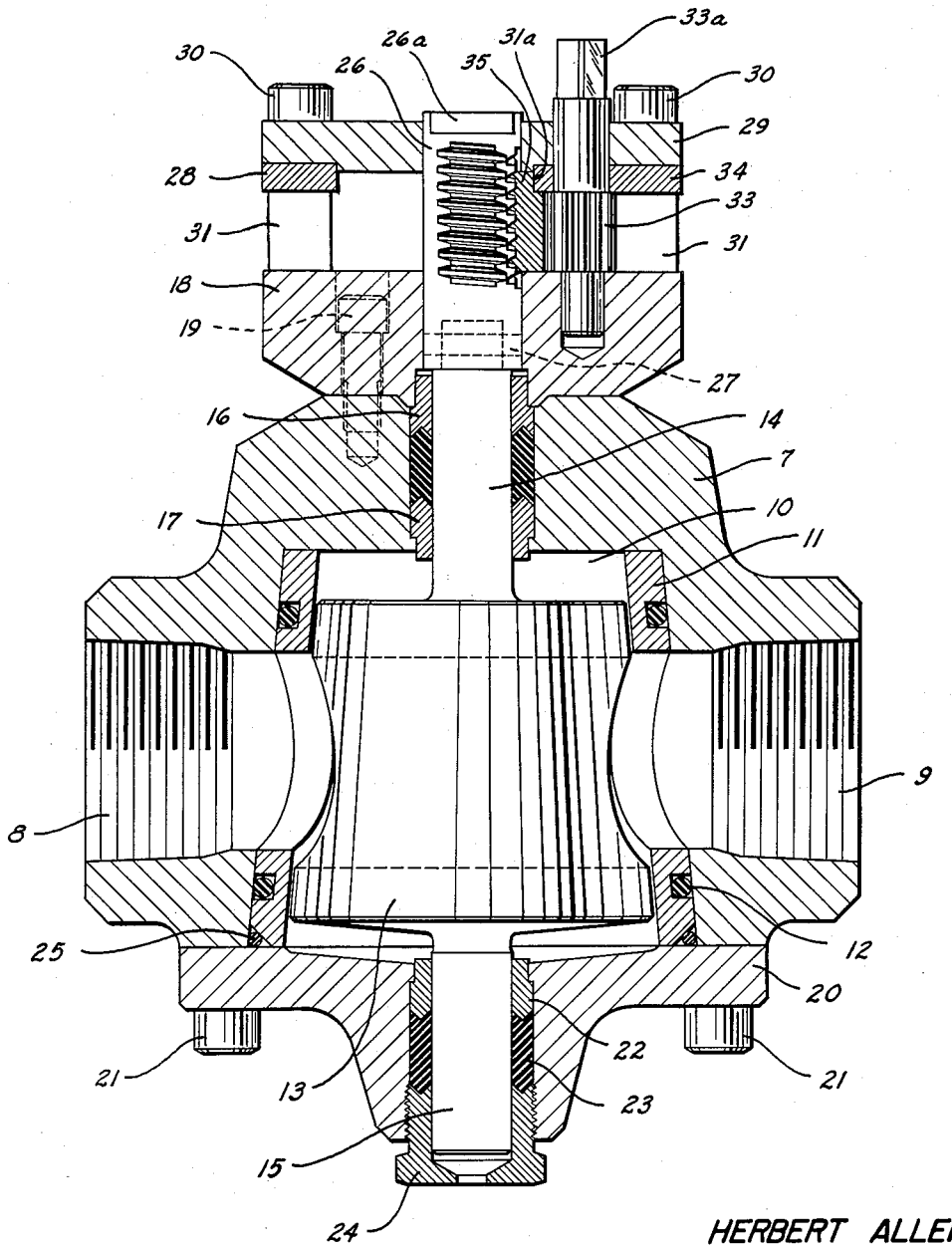
Fig. 2 is a vertical sectional elevation taken along the line 2—2 in Fig. 1 in the direction of the arrows.
Figure 5:
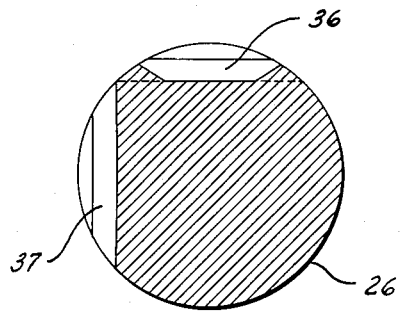
Fig. 5 is a view taken along the line 5—5 in Fig. 4 in the direction of the arrows.
Figure 4:
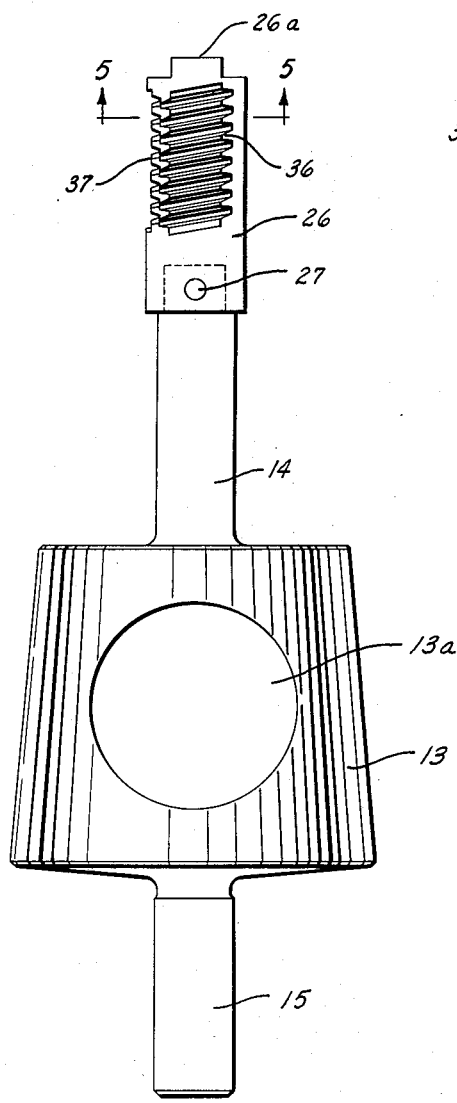
Fig. 4 is a side elevational view of the plug valve member with the drive part secured thereto as employed in the valve shown in the drawings.

Referring to the drawings in detail, and more particularly Fig. 2, there is shown a plug type valve for controlling flow through a conduit. The valve comprises a body 7 having a flow passage therethrough with fittings 8 and 9 facilitating connection of the valve in a conduit. The body has a central recess 10 with a tapered wall for receiving, if this is desired, a liner seat 11. It is to be understood that the liner 11 is not essential and when employed preferably suitable seal elements, such as O-rings 12, are provided surrounding the flow passage to form seals between the body and the liner.

A plug valve member 13, having a tapered surface corresponding to the taper of the valve seat, is mounted within the valve body. The mounting is such as to provide for rotation of the plug valve member and also for straight line or endwise movement of the plug valve member along its rotational axis. In the present embodiment, the mounting includes upper and lower stems 14 and 15 respectively, which bear in suitable bushings included in upper and lower stuffing boxes surrounding the stems. The upper stem 14 extends through the stuffing box including bushing 17 and gland bushing 16 with packing material being held in place between these two bushings. A support base 18 or bonnet is provided for mounting the actuator for the plug valve member and is secured as by bolts 19 to the body. This base member has a central aperture aligned with bushing 16 with an internal shoulder providing a stop for this bushing. The bushing 17 seats on an internal shoulder formed in body 7 and tightening up of the bolts 19 tightens the packing.

The stuffing box surrounding stem 15 includes a body plate 20 secured to the base of body 7 by suitable fastening means as bolts 21 with O-ring 25 sealing between the body 7 and plate 20. This base plate has a central aperture through which the lower stem 15 extends. A bushing 22 seats against an internal shoulder formed in the aperture through plate 20 and packing material 23 is retained within the aperture by gland nut 24.

The plug valve member has a passage 13a extending therethrough and adapted in one position of the plug valve member to align with openings through fittings 8 and 9 and similar openings through the seat liner 11. When the plug valve member is rotated 90° from its position shown in Fig. 2 of the drawings and with the plug valve member firmly seated against liner 11, it will be apparent that the valve will be closed. The mounting of the plug valve member is such that in effecting this rotative movement of the plug valve member from one operative position to the other, the plug valve member can be moved endwise and downwardly so as to unseat it from the tapered seat whereby it is free to rotate to the other operative position. Then, when moved endwise upwardly to seated position, it will control flow in a manner dependent upon the rotative orientation of passage 13a. However, the bearings or journals for the stems 14 and 15 are such that the plug valve member and stems are maintained on a fixed rotational axis relative to the valve body.

The actuating mechanism for the plug valve member comprises a drive part or member 26 fixedly secured to the plug valve member as by a pin 27 extending through registering apertures in the upper end of stem 14 and the part 26. The part 26 extends through plate 18 and preferably has a bearing provided in an upper plate 29. The plate 29 is secured to support plate 18 by suitable means such as bolts 30 and is held spaced therefrom by tubular spacers 31, the stop bar 28 and guide 34.

Also mounted for rotation about an axis fixed relative to that of the plug valve member, is a drive part 33 which may be a pinion. This drive part or drive member is journaled in the plates 18 and 29. In order to transmit motion between the drive member 33 and the drive part or member 26 so as to reciprocate the latter along its rotational axis and to rotate it, there is provided an angle element 35 restrained and guided by the stop bar 28, guide 34 and plate 29. The element 35 has a drive connection with drive part 33. The arrangement is such that rotation of the drive part 33 will impart lengthwise movement to the angular element 35. It is preferred to use a pinion for the member 33 and a cooperating rack for the angle member 35. The drive periphery of the angle element, at its bend, if the drive member 33 rotates about an axis parallel to the rotational axis of the plug valve member, should be formed on an arc struck on a radius about the rotational axis of the member 26. The rotational axis of the pinion is in a plane including the rotational axis of the plug valve member and the longitudinal axis of the flow passage through the valve body. The rack is mounted between pinion 33 and member 26 and is adapted to be moved lengthwise therebetween by the pinion. The pinion and the surface 31a of guide 34 hold the rack against rotation except as the pinion drives past the angle. The rack end also abuts the face of the stop bar 28 to limit the rotation to 90° and furnish a guide to stabilize the motion of rack 35.

It is necessary to translate the lengthwise movement of angle element 35 into both reciprocal straight line movement and rotative movement of the member 26. In order to impart the straight line movement to the member 26, cooperating cam parts are provided between the member 26 and each arm or side of the rack 35. The cam parts are such that when those carried by the member 26 are in engagement with those carried by the angle element on one side of the angle, movement of the angle element due to rotation of the drive member 33, in one direction, will impart straight line movement to the member 26 in one directional sense, and reverse rotation of the member 33 will impart straight line movement to member 26 in the opposite direction. The arrangement of the cam parts on the opposite side of the angle of rack 35 are such as to impart straight line movement to part 26 in a reversed directional sense. The rotative movement of member 26 is provided for by cooperating stops carried by the angle element and the member 26 adapted to engage to maintain relative rotational positions between the angle element and member 26 when the pinion 33 drives past the angular portion of rack 35.

By arranging the cam parts in the form of cam teeth 36 and 37, oppositely inclined, upon the part 26, and teeth 38 and 39 formed on the confronting sides of rack 35 respectively, and upon opposite sides of the angle of the element, a single means provides both the cooperating cam parts and the cooperating stop parts between the angle element 35 and the member 26. The teeth 38 and 39 are also oppositely inclined so as to mesh with the teeth 36 and 37 respectively of the member 26. It will be seen that teeth 37 and 39 and teeth 36 and 38 provide cooperating straight or flat surfaces between the rack or angle element 35, on each side of the angle thereof, and the portion of the member 26 which carries the cam teeth 36 and 37. The arrangement is such that during rotation of the valve the meshing teeth between part 26 and rack 35 do not have a wedge action but that the peaks of at least one set of the teeth will engage the valley between the other to provide cooperating stop surfaces. By way of example, when the plug valve is in open position and seated, rack 35 is in a position such that member 26 is near the outer end of teeth 38 (rack 35 is positioned downwardly towards the bottom of the drawing from its position as viewed in Fig. 1), with teeth 38 and 36 in engagement and teeth 39 and 37 out of engagement. To close the valve, pinion 33 is rotated clockwise, moving rack 35 toward the top of the drawing until the Fig. 1 position is reached, which movement axially lowers the valve. As the rack approaches the Fig. 1 position, teeth 39 and 37 engage by movement of teeth 39 facewise into teeth 37. Thus, in the Fig. 1 position, teeth 36 and 38 and teeth 37 and 39 are engaged. Since the two pairs of mutually engaging teeth are inclined toward each other, teeth 37 and 39 provide a stop against the wedge action of teeth 36 and 38, and, by the same token, teeth 36 and 38 provide a stop against the wedge action of teeth 37 and 39 so that the valve member is held against rotative movement with respect to rack 35 during the time rotation of pinion 33 carries rack 35 through the desired arc. Continued rotation of the pinion will then cause teeth 36 and 38 to be disengaged. Further clockwise rotation of pinion 33 will seat the valve through the wedge action supplied by cooperating teeth 37 and 39. In the Fig. 1 view, the arrangement is shown with these cooperating flat surfaces engaged so that as the pinion 33 is rotated clockwise, as viewed in the drawings, the rack 35 will be swung about an arc of 90° counterclockwise and this will cause the member 26 to rotate 90° with the angle element or rack.

It is believed that the operation of the actuator mechanism is readily apparent from the foregoing description. When the pinion rotates past that portion of the rack which traverses the angle of the rack, rotational movement of the member 26 will be provided. The angle of the rack or angle element 35 will be formed on planes which will be parallel to the flat surfaces of the member 26 so that the degree of rotation of member 26 will be a function of the angle on which the member 35 is formed. If the angle of the rack is greater than 90°, member 26 will rotate less than 90°; however, if the angle of the rack is less than 90°, then the rotation of the member 26 will be greater than 90°. Thus, while it is usually desirable in plug valves to rotate the plug valve member 90°, nevertheless, it is seen that some other degree of rotation is available by choosing the particular angle upon which the rack is formed. A rule of thumb is that the sum of the rack angle and the angle of rotation of the plug valve member will be 180°.

The reciprocal straight line movement is imparted to the member 26 when the pinion traverses the straight portion of the rack on each side of the angle. Arrangement of the cam teeth will, of course, determine whether the member 26 is raised or lowered when the rack is moved one way or the other.

Preferably, when the actuator is to be used for actuating a plug valve member, the angle of inclination of the teeth on one side of the angle of the rack, relative to a plane normal to the rotational axis of member 26, will be less than that of the teeth on the other side of the rack. Usually, it is desirable to seat the plug valve member with greater force and more securely against the seat in its closed position to perfect a seal than in its open position. For this reason, it is desirable that the angle of the rack teeth which causes seating and unseating of the plug valve member into and out of closed position be less than is the case of the teeth which cause seating and unseating into and out of open position of the plug valve member. This provides a greater mechanical advantage for forcing the plug valve member into a positive seat and to break the plug valve member from the seat when closing and opening the valve respectively. Inasmuch as the seal requirements for the plug valve member in open position are not as severe as when the valve is closed, the angle of inclination of the teeth which cause seating and unseating of the plug valve member in and out of open position may be steeper than the other teeth. This sacrifice of mechanical advantage speeds up this portion of the operation.

The pinion 33 may carry an out-of-round wrench part 33a at the upper end of the shaft which extends through plate 29. This then can be secured to a suitable drive means such as a lever or hand wheel. Preferably the upper end of member 26 has formed thereon a lug 26a which indicates the rotative position of passage 13a within the plug valve member. Thus, when the plug 26a is in alignment with the flow passage through the valve body, as shown in Figs. 1 and 2, it will be indicated that the plug valve member is in open operative position while if the plug 26a is transverse to the line of flow through the plug valve body, this indicates that the plug valve member is in closed operative position.

Figure 1:
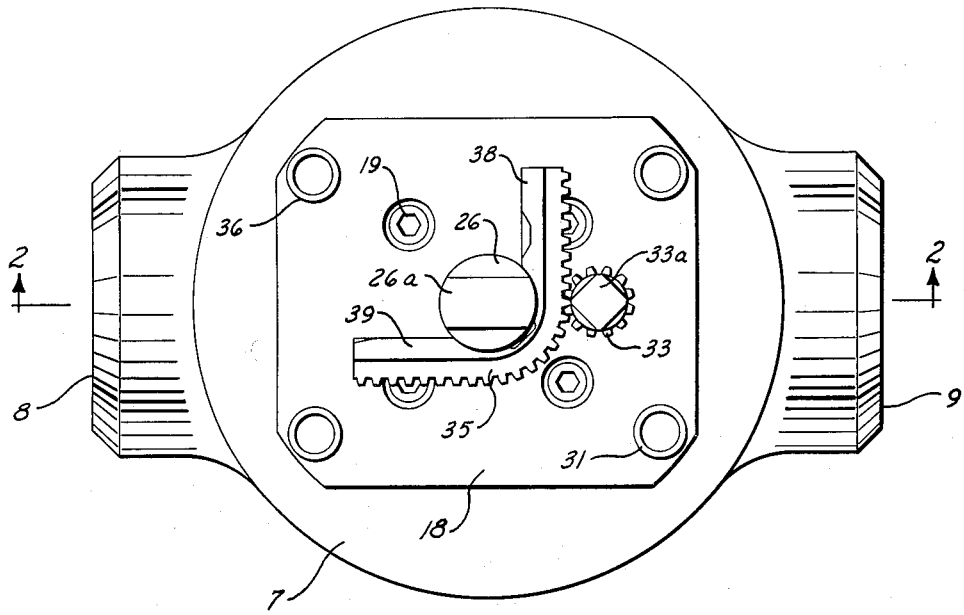
Fig. 1 is a top plan view of a valve and actuator therefor embodying this invention, certain parts being removed to expose the mechanism.
Figure 3:
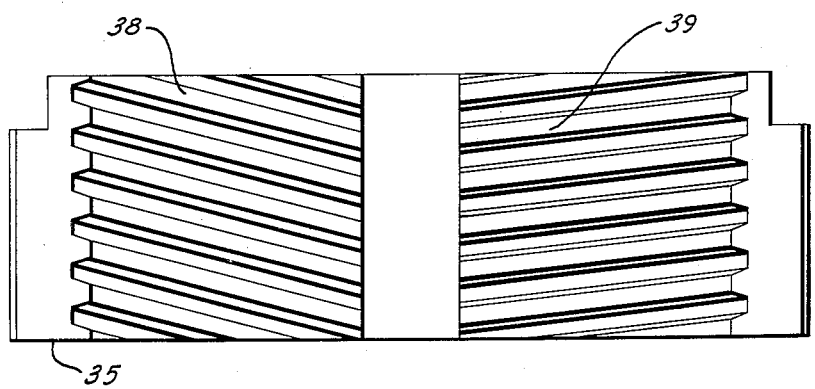
Fig. 3 is an elevational view showing the cam surfaces formed upon the rack employed in the valve shown in Figs. 1 and 2.

Recapitulating, with the pinion, rack and member 26 in their positions shown in Fig. 1, counterclockwise movement of the pinion as viewed in this figure will move the rack lengthwise downwardly and engagement of the cam teeth 36 and 38 formed on the drive member and rack respectively, will force the plug valve upwardly into seated position with the valve open. Preferably the angle of inclination of these cooperating cam teeth 36 and 38 will be greater than the angle of inclination of the other cooperating cam teeth with regard to a plane normal to the rotational axis of the plug valve member.

On the other hand, when the parts are in position with the valve member open and seated and pinion 33 is rotated clockwise, the resultant movement of the rack 35 will be upward, as viewed in Fig. 1, until the position shown in Fig. 1 is reached. This will cause a moving of the plug valve member 13 away from the seat so that it may freely rotate. Due to the mechanical advantage provided, the plug valve member will be moved from its seat regardless of how tight it might have been forced against the seat. When the parts reach the Fig. 1 position, additional clockwise rotative movement of pinion 33 will rock the rack about the rotational axis of member 26 and plug valve member 13 causing them to rotate to a new position. This counterclockwise rotation of the rack and member 26 is stopped by engagement of the end of the rack against the stop bar 28. Then as the clockwise rotation of pinion 33 continues and drives past the straight portion of the rack to the left of the angle, as viewed in Fig. 1, the plug valve member will be forced into seated position with passage 13a across the passage connecting fittings 8 and 9. This reseating results from the angle of inclination of the co-engaging cam teeth 39 and 37 of the rack and part 26 respectively.

Inasmuch as it is not necessary to seat the plug valve member with the same degree of force in its open position in order to provide a seal, the angle of teeth 37 and 39 may be much smaller than are the angle of teeth 36 and 38. Due to this difference in angle, the plug valve member will come to seated position in its open operative position with lesser degree of turning of pinion 33 than is required to seat the plug valve member in closed position. With the pinion and rack in the last described or closed position, movement of the pinion counterclockwise will first cause an unseating of plug valve member 13 and then clockwise rotation of the rack 35, member 26 and valve member 13 until the parts reach their Figure 1, or open, position. Then additional counterclockwise movement of the pinion will, by the action of inter-engaging cam teeth 36 and 38, seat the plug valve member 13 in the manner hereinbefore described.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An actuator mechanism for a valve of the type having a plug valve member mounted in a valve body for rotation and limited endwise movement on a common axis, comprising, a stem, a rack and pinion drive means, and drive parts between the stem and rack for actuating the stem upon rotation of the pinion to impart to the stem both rotation and straight line movement, said drive parts including oppositely inclined cams on the rack which first impart straight line movement to the stem in one direction and then in the opposite direction upon continued rotation of the pinion in one direction.

2. An actuator mechanism for a valve of the type having a plug valve member mounted in a valve body for rotation and limited endwise movement on a common axis, comprising, a stem, an angular rack, a pinion mounted to drive the rack, a guide surface carried by the body cooperating with the pinion to maintain the rack in fixed rotative positions relative to the body except when the pinion drives over the angular portion of the rack, and drive parts between the stem and rack for actuating the stem upon rotation of the pinion to impart to the stem both rotation and straight line movement.

3. An actuator comprising a rotatable member mounted for rotation and for reciprocal straight line movement along its rotational axis, an angle element, a drive member rotatably mounted about a fixed axis relative to the rotational axis of the member, said drive member having a drive connection with the angle element, the angle element mounted for lengthwise movement between the drive member and rotatable member as it is actuated by the former, cooperable stop surfaces formed on the angle element and drive rotatable member and engageable to provide rotative movement of the rotatable member as the drive member actuates the angle element at the angle thereof, and cooperating cam parts on the angle element and rotatable member adapted to engage to impart straight line movement to the rotatable member along its rotational axis when the angle element is moved relative to the rotatable member.

4. An actuator mechanism for a valve of the type having a plug valve member mounted in a valve body for rotation and limited endwise movement on a common axis, comprising, a stem, an angle element, a drive member rotatably mounted about a fixed axis relative to the rotational axis of the stem, said drive member having a drive connection with the angle element, the angle element mounted for lengthwise movement between the drive member and a drive part carried by the stem when the angle element is actuated by the drive member, cooperable stop surfaces formed on the angle element and the drive part of the stem and engageable to prevent relative movement between the angle element and the stem as the drive member actuates the angle element at its angular portion, and cooperating cam parts on the angle element and the drive part of the stem adapted to engage to impart straight line movement to the stem along its rotational axis when the angle element is moved relative to the stem.

5. An actuator comprising a member mounted for rotation and for reciprocal straight line movement along its rotational axis, an angularly formed rack, a pinion having a driving connection with the rack and mounted for rotation about a fixed axis relative to the rotational axis of the member, said rack mounted for lengthwise movement between the pinion and member when the rack is actuated by the pinion, cooperable stop surfaces formed on the rack and member and engageable to prevent relative movement of the member as the pinion drives the rack at its bent portion, and cooperating cam parts on the rack and member adapted to engage to impart reciprocating movement to the member along its rotational axis when the rack is moved relative to the member.

6. The actuator of claim 5 wherein the cam parts are inclined cam teeth formed upon the member and rack.

7. The actuator of claim 5 wherein the cam parts are inclined cam teeth formed upon the member and rack, the teeth having different angles of inclination on each side of the rack angle.

8. An actuator comprising a member mounted for rotation and for reciprocal straight line movement along its rotational axis, an angularly formed rack, a pinion having a driving connection with the rack and mounted for rotation about an axis fixed relative to the rotational axis of the member, flat faces on the member in planes intersecting at an angle corresponding to the angle on which the rack is formed, flat faces on the rack, on both sides of the angle confronting and engageable with corresponding faces on the member, and cooperating cam parts on the rack and member adapted to engage to impart straight line movement to the member along its rotational axis, when the rack is moved relative to the member.

9. An actuator comprising a member mounted for rotation and for reciprocal straight line movement along its rotational axis, an angularly formed rack, a pinion engaging the rack and mounted for rotation about a fixed axis relative to the rotational axis of the member, cam teeth on the side of the rack included within the angle and upon each side of the angle, the teeth on each side of the angle being oppositely inclined, and cam teeth arranged on the member, part of the member's cam teeth engageable by the teeth on one side of the rack angle and part of the member's cam teeth engageable by the teeth on the other side of the rack angle whereby the member and rack are maintained in a fixed relative rotative position and movement of the rack by rotation of the pinion imparts both rotative and reciprocal straight line movement to the member.

10. The actuator of claim 9 wherein the angle of inclination of the cam teeth on the rack is different on the two sides of the angle of the rack.

11. An actuator mechanism for a valve of the type having a plug valve member mounted in a valve body for rotation and limited endwise movement on a common axis, comprising, a stem, a drive part carried by the stem, the drive part being rotatable about the rotational axis of the stem and being fixed relative to the stem, a pinion and angularly formed rack, said pinion mounted for rotation about a fixed axis relative to the rotational axis of the stem and the rack mounted for lengthwise movement between the pinion and drive part of the stem as the rack is actuated by the former, cooperable stop surfaces formed on the rack and drive part of the stem and engageable to maintain a relative rotational position between the rack and stem as the pinion drives the rack, and cooperating cam parts on the rack and stem adapted to engage to impart reciprocating straight line movement to the stem along its rotational axis when the rack is moved relative to the drive part for the stem.

12. The actuator of claim 11 wherein the cam parts are inclined cam teeth formed upon the drive part for the stem and upon the rack.

13. The actuator of claim 11 wherein the cam parts are inclined cam teeth formed upon the drive part for the stem and upon the rack with the cam teeth of the rack having different angles of inclination on each side of the rack angle.

14. The actuator of claim 11 wherein the pinion carries a part engageable by a drive means.

15. An actuator mechanism for a valve of the type having a plug valve member mounted in a valve body for rotation and limited endwise movement on a common axis, comprising, a stem, a drive part fixedly carried by the stem, a pinion and angularly formed rack, said pinion being mounted for rotation about an axis fixed relative to the rotational axis of the stem, flat eccentric faces upon the drive part for the stem in planes intersecting at an angle corresponding to that on which the rack is formed, corresponding flat faces on the rack, on both sides of the angle, confronting and engageable with corresponding faces on the drive part for the stem, and cooperating cam parts on the rack and drive part for the stem adapted to engage to impart straight line movement to the stem along its rotational axis when the rack is moved relative to the stem drive part.

16. An actuator mechanism for a valve of the type having a plug valve member mounted in a valve body for rotation and limited endwise movement on a common axis, comprising, a stem, a drive part fixed to the stem, a pinion and angularly formed rack, said pinion being mounted for rotation about an axis fixed relative to the rotational axis of the stem, cam teeth on the rack on each side of the angle thereof, the teeth on each side of the angle being oppositely inclined and cam teeth eccentrically arranged on the drive part for the stem, part of the latter teeth being engageable by the teeth of the rack on one side of the angle and the other part of the teeth on the drive part being engageable by the teeth formed on the other side of the rack angle, whereby the stem and rack are maintained in a fixed relative rotative position and movement of the rack by rotation of the pinion imparts both rotative and straight line movement to the stem.

17. The actuator of claim 16 wherein the angle of inclination of the cam teeth on the rack is different on the opposite sides of the rack angle.

18. An actuator mechanism for a valve of the type having a plug valve member mounted in a valve body for rotation and limited endwise movement on a common axis; comprising; a stem; a rack and pinion drive means; and cooperating cam and stop parts on the stem and rack which will impart rectilinear, then rotary, and then reverse rectilinear movement to the stem in response to continued rotation of the pinion in one direction; said parts including oppositely inclined cam teeth on both the stem and the rack.

19. An actuator, comprising, a member mounted for rotation and for rectilinear movement along its rotational axis, a pinion rotatably mounted about a fixed axis relative to the rotational axis of the member and having a drive connection with a rack mounted for lengthwise movement between the pinion and rotatable member, and cooperable stop and cam parts formed on the rack and rotatable member engageable to provide rotative movement of the rotatable member as the pinion actuates an intermediate segment of the rack and to impart straight line movement to the rotatable member along its rotatable axis when the pinion is rotating in engagement with either end segment of the rack, rotation of the pinion in a given directional sense imparting straight line movement in one direction when engaging one end of the rack and the opposite direction when engaging the other end of the rack.

20. An actuator mechanism for a valve of the type having a member mounted for rotation and for rectilinear movement along its rotational axis; comprising; a rack for imparting rotational and rectilinear movement to said member and a pinion for imparting movement to said rack; and cam means on said rotatable member; said rack having spaced apart oppositely inclined cam teeth engageable with the cam means on the rotatable member which, upon continued rotation of the pinion in one direction, will impart rectilinear movement to the rotatable member in one direction when the cam means on the rotatable member are engaged by one of said oppositely inclined cam teeth and in the opposite direction when the cam means on the rotatable member are engaged by the other of said oppositely inclined cam teeth.

21. The actuator mechanism of claim 20, wherein the cam means on the rotatable member include two cam teeth, one engageable by one of the rack cam teeth to impart rectilinear movement to the member in one direction and the other engageable by the other of said cam teeth on the rack to impart reverse rectilinear movement to the rotatable member upon continued rotation of the pinion in one direction.

References Cited in the file of this patent

UNITED STATES PATENTS

| | | |
|---|---|---|
| 1,533,155 | Zitterbart | April 14, 1925 |
| 2,129,081 | Brisbane et al. | Sept. 6, 1938 |
| 2,144,305 | Brisbane | Jan. 17, 1939 |
| 2,383,549 | Hilker | Aug. 28, 1945 |